United States Patent [19]

Föhl

[11] Patent Number: 5,029,769

[45] Date of Patent: Jul. 9, 1991

[54] SAFETY BELT RETRACTOR HAVING WEBBING CLAMPING MEANS

[75] Inventor: Artur Föhl, Schorndorf, Fed. Rep. of Germany

[73] Assignee: TRW Repa GmbH, Alfdorf, Fed. Rep. of Germany

[21] Appl. No.: 470,096

[22] Filed: Jan. 25, 1990

[30] Foreign Application Priority Data

Jan. 26, 1989 [DE] Fed. Rep. of Germany ....... 3902295

[51] Int. Cl.⁵ ............................................. B60R 22/42
[52] U.S. Cl. ............................ 242/107.2; 242/107.4 B
[58] Field of Search ...................... 242/107.2, 107.4 B, 242/107.4 A; 280/806; 297/478, 480

[56] References Cited

U.S. PATENT DOCUMENTS

| | | | |
|---|---|---|---|
| 3,504,867 | 4/1970 | Stevenson | 242/107.2 |
| 3,955,774 | 5/1976 | Weman | 242/107.4 B |
| 4,071,204 | 1/1978 | Booth | 242/107.4 B |
| 4,241,886 | 12/1980 | Maekawa et al. | 242/107.2 |
| 4,570,975 | 2/1986 | Kawaguchi et al. | 242/107.2 X |
| 4,865,263 | 9/1989 | Ervin | 242/107.2 |
| 4,928,902 | 5/1990 | Tsuji | 242/107.2 |

FOREIGN PATENT DOCUMENTS

| | | |
|---|---|---|
| 2826286 | 12/1979 | Fed. Rep. of Germany . |
| 3009701 | 9/1981 | Fed. Rep. of Germany . |
| 3330938 | 3/1984 | Fed. Rep. of Germany . |
| 3417877 | 11/1985 | Fed. Rep. of Germany . |
| 3510673 | 9/1986 | Fed. Rep. of Germany . |
| 3629091 | 3/1988 | Fed. Rep. of Germany . |

Primary Examiner—John M. Jillions
Attorney, Agent, or Firm—Tarolli, Sundheim & Covell

[57] ABSTRACT

A retractor shaft is rotatably mounted in a loadbearing housing. A webbing clamping means consists of a clamping member mounted movably on the housing and a housing-fixed clamping face disposed opposite to and spaced from said member. The actuation of the clamping member is via an actuating nose on a ring which is provided with an internal toothing and which is rotatably mounted on a side plate of the housing. On one side of the retractor shaft two pawls are eccentrically and pivotally mounted in their center of gravity in such a manner that the engagement faces lie opposite the internal toothing of the ring. The pawls are driven by mass inertia forces against the force of a return spring into coupling engagement with the internal toothing of the ring. The longitudinal component of the arcuate movement of the actuating nose is transmitted directly via a pin and a slot to the clamping member.

13 Claims, 7 Drawing Sheets

SAFETY BELT RETRACTOR HAVING WEBBING CLAMPING MEANS

The invention relates to a safety belt retractor having a loadbearing housing, a retractor shaft mounted rotatably in the housing, a webbing clamping means following the retractor shaft in the webbing withdrawal direction and having a clamping member mounted movably on the housing and a housing-fixed clamping face opposite and spaced from said member and an actuating means which is activatable at least in webbing sensitive manner and which on activation presses the clamping member against the webbing and the latter against the clamping face.

Safety belt retractors comprising a webbing clamping means following the retractor shaft are known in various constructions. Compared with safety belt retractors of which the belt reel is loadbearingly blocked in vehicle or webbing sensitive manner to prevent further webbing withdrawal they have the advantage of avoiding the so-called film reel effect which leads to an undesirable webbing withdrawal by tightening the webbing coil. The safety belt retractors available at present comprising webbing clamping means are however more complicated and involve higher production costs than conventional safety belt retractors with loadbearing belt reel blocking.

The invention provides a safety belt retractor having webbing clamping means which can be made economically from a few individual parts and operates with short control travels to respond particularly rapidly and reliably.

The safety belt retractor of the present invention has actuating means which comprise an internally toothed ring rotatably mounted on the housing, an actuating nose connected to said ring and at least one pawl which is mounted laterally on the retractor shaft eccentrically and pivotally and the engagement face of which lies opposite the internal toothing of the ring and which by mass inertial forces can be driven against the force of a return spring into coupling engagement with the internal toothing of the ring. On sudden webbing withdrawal, i.e. responsive to the webbing, due to the inertial and centrifugal forces acting thereon the pawl, preferably mounted at least approximately at its centre of gravity, is driven into coupling engagement with the internal toothing of the ring before the retractor shaft has reached a high peripheral speed. Since in most cases the pawl drops into the next available tooth gap of the inner toothing, the coupling engagement is completed after a few angular degrees of the retractor shaft rotation. The ring and the actuating nose connected thereto are entrained on further rotation of the retractor shaft due to the webbing tension and the pivot movement of the actuating nose is transmitted directly to the clamping member, a rotation of the ring or pivoting of the actuating nose of a few angular degrees sufficing to effect the actuating stroke of the clamping member.

In a preferred embodiment, a further shortening of the response time in conjunction with an increase in the reliability is achieved in that at the side of the retractor shaft a second pawl is mounted eccentrically and pivotally and the engagement faces of the two pawls at the side of the retractor shaft are offset with respect to each other in the peripheral direction by an angle which corresponds at least approximately to an odd multiple of half the pitch step of the internal toothing of the ring.

If with its engagement face one of the two pawls should strike a tooth tip of the internal toothing of the ring, there then being a danger of bouncing off and delay of the coupling engagement, the engagement face of the other pawl is certain to enter between two adjacent teeth of the internal toothing so that then the coupling engagement is completed after a retractor shaft rotation which corresponds only to half the pitch step of the internal toothing.

A further advantage of the safety belt retractor according to the invention resides in that for the activation of the webbing clamping means small control forces suffice because the rotation of the retractor shaft caused by the belt pulling is transmitted in the most direct way. i.e. largely avoiding losses, as actuating stroke to the clamping member. Once the clamping member has been brought up to the webbing and the clamping effect starts, a self-intensifying effect occurs in known manner and as a result the clamping force increases overproportionally with increasing webbing tension. It thus need only be ensured that the minimum possible actuating forces are necessary for moving the clamping lever up to the webbing. This is achieved in a further advantageous embodiment in that the clamping member and the housing comprise cooperating translational guide means such as grooves and slots and ribs or webs slidingly displaceable therein.

Furthermore, the safety belt retractor according to the invention is preferably also provided with a vehicle responsive activating means. The latter consists in a manner known per se of an inertia sensor with control pawl and a control gear of which the teeth lie opposite the control pawl and which is mounted at the same side of the retractor shaft as the pawl rotatably in limited manner with respect to the latter. The control gear carries an actuating nose which acts directly on the pawl in order to effect on the shortest possible path a coupling engagement between the pawl and the internal toothing of the ring.

Further features and advantages of the invention will be apparent from the subsidiary claims and from the following description of several preferred embodiments and the drawings to which reference is made and in which:

Figure 1:
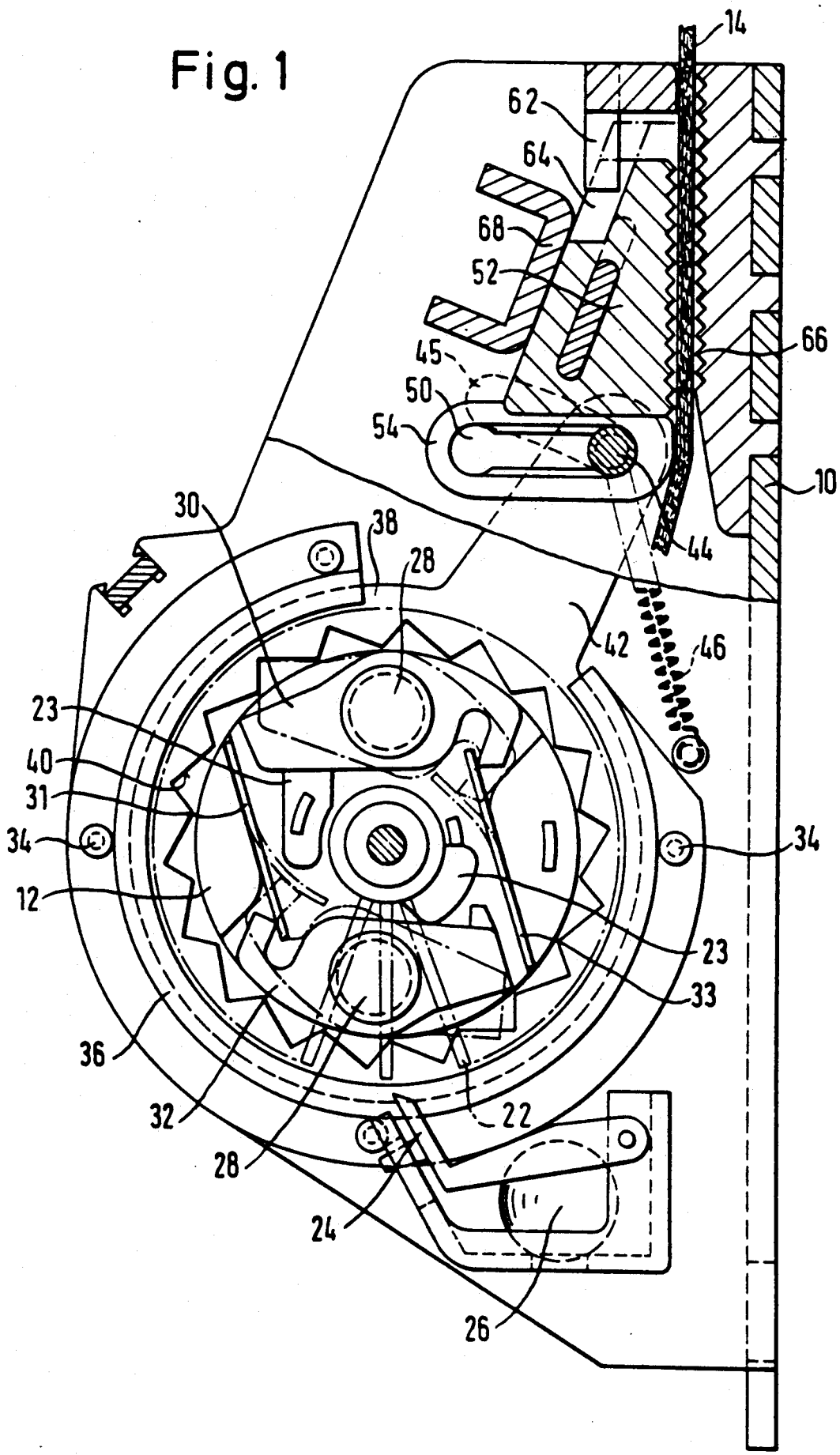
FIG. 1, is a partially sectioned side elevation of a first embodiment of the safety belt retractor.

In both embodiments a retractor shaft 12 is rotatably mounted in a loadbearing housing 10. The retractor shaft receiving the webbing 14 is provided with lateral axial bearing extensions 16, 18. A retractor spring 20 engages the bearing extension 16. On the bearing extension 18 the hub 20 of a control gear 22 is rotatably mounted. The control gear 22 cooperates with a control pawl 24 which by an inertia sensor in the form of a mass ball 26 is movable into engagement with the teeth of the control gear 22.

On the one side face of the retractor shaft 12 lying adjacent the control gear 22 two pawls 30, 32 are mounted by means of bearing pins 28 in pivotal manner lying approximately diametrically opposite each other. Between a side wall of the housing 10 and a partially annular guide disc 36 secured thereto by rivets 34 a receiving space is formed in which with slight clearance a ring 38 is rotatably received and guided. Said ring 38 is provided with an internal toothing 40 which surrounds the engagement faces of the pawls 30, 32. An actuating nose in the form of an extension arm 42 is connected to the outer periphery of the ring 38. At its free end the extension arm 42 carries a pin 44 which projects in the axial direction (with respect to the retractor shaft 12) and extends through an arcuate slot 45 in a side plate of the housing 10 and to the one end of which the one end of a return spring 46 is attached, the other end of which is secured to the housing 10. The other end of the pin 44 is provided with a cylindrical groove 48 and engages into a slot 50 which is formed in an eye-like transmission member 54 connected to a clamping shoe 52. The clamping shoe 52 is provided laterally with rib-like or web-like extensions 54, 56 which are guided freely in correspondingly formed slots 58, 60 in the side walls of the housing 10. A further guiding of the clamping shoe 52 is effected by a housing-fixed rib 62 which engages into a guide groove 64 of the clamping shoe 52, the extensions 54, 56 and the rib 62 being arranged perpendicularly with respect to each other so that a three-dimensional guiding of the clamping shoe 52 is ensured.

The clamping shoe 52 lies opposite to and slightly spaced from a housing-fixed clamping face 66 so that as long as the clamping means is not activated the webbing 14 can pass unrestricted between the clamping face 66 and the clamping shoe 52. On its rear side remote from the clamping face 66 the clamping shoe 52 is supported by a loadbearing stirrup member 68 which is U-shaped in cross-section and is anchored in the side walls of the housing 10.

The pawls 30, 32 are mounted at least approximately in their centre of gravity and are each subjected to the action of a return spring 31 or 33 which in the embodiment shown is constructed as leaf spring and on the one hand is clamped at the side of the retractor shaft 12 and on the other bears with its free end on the inner side of a hook-like extension of the pawl 30 or 32 which lies opposite the engagement face of said pawl.

The control gear 22 bears two cam-like actuating noses 23 which engage respectively on the inner face of the adjacent pawl 30 or 32 when the latter is held by the associated spring 31 or 33 in its rest position out of engagement with the internal toothing 40 of the ring 38.

The mode of operation of this embodiment of the safety belt retractor will now be described.

On abrupt withdrawal of the webbing 14 from the retractor shaft 12 a high angular acceleration occurs at the latter and is transmitted via the bearing pins 28 to the pawls 30, 32. Since the pawls 30, 32 due to their mass inertia tend to remain in their position defined in space whilst the retractor shaft 12 executes a rotational movement, the engagement faces of the pawls 30, 32 are pivoted outwardly and come into engagement with the internal toothing 40 of the ring 38. The engagement faces of the pawls 30, 32 are however offset with respect to each other in the peripheral direction by an angle which corresponds at least approximately to an odd multiple of half the pitch step of the internal toothing 40 of the ring 38. Thus, as can be seen from FIG. 1 the pawl 32 lies with its nose-like engagement face exactly opposite a tooth tip of the internal toothing 40 whilst the pawl 30 with its engagement face lies opposite a tooth back zone substantially centrally between two consecutive tooth tips of the internal toothing 40. In the unlikely event that the engagement face of one of the pawls 30, 32 strikes a tooth tip of the internal toothing 40, the retractor shaft 12 has not yet reached a high peripheral speed because the pawls 30, 32 respond to inertial force and consequently there is in fact no danger of the pawl bouncing off. In such a situation however the second pawl, after a further rotation of the retractor shaft through a few angular degrees corresponding to about half the tooth pitch, will engage into a tooth gap of the internal toothing 40. The coupling engagement between the retractor shaft 12 and the ring 38 is therefore effected with certainty in every case after rotation of the retractor shaft through a few angular degrees.

On further rotation of the retractor shaft 12 the ring 38 is entrained and as a result it pivots the cantilever-like actuating nose 42 and the pin 44 secured thereon and guided in the slide-like slot 45 moves up in the slot 50. The pin 44 describes the arcuate movement indicated in dashed lines in FIG. 1. The projection of the arc thus described onto a plane parallel to the clamping face 66 has a length which corresponds to the actuating travel of the clamping shoe 52.

The longitudinal component of the arcuate movement of the pin 44 directed parallel to the clamping face 66 is transmitted via the edge of the slot 50 and the transmission member 54 to the clamping shoe 52 and thus imparts to the latter a movement having a direction defined by the translational guide means which consist of the lateral extensions 54, 56, the slots 58, 60, the rib 62 and the slot 64. The movement of the clamping shoe 52 is directed inclined to the webbing 14 and to the clamping face 66. As soon as the clamping shoe 52 engages the webbing 14 and presses the webbing against the clamping face 66 a self-intensifying effect occurs due to the wedge-form of the clamping shoe 52 and as a result the clamping force increases overproportionally with increasing tensile force in the webbing 14. The geometrical conditions are however so chosen that after completion of the belt pulling the clamping shoe 52 returns under the action of the return spring 46 to its rest position in which the webbing 14 can freely pass between the clamping face 66 and the clamping shoe 52.

The groove 48 of the pin 44 also contributes to clean guiding of the clamping shoe 52 in that the radial faces defining the groove 48 bear on the sides of the transmission member 54.

The vehicle-sensitive release is by means of the mass ball 26 and the control pawl 24 which drops between the teeth of the control gear 22 and stops the latter so that a relative rotation occurs between belt shaft 12 and control gear 22 and is transmitted by means of the cam-like actuating noses 23 to the pawls 30, 32 to deflect the latter into the internal toothing 40 of the ring 38.

Figure 2:
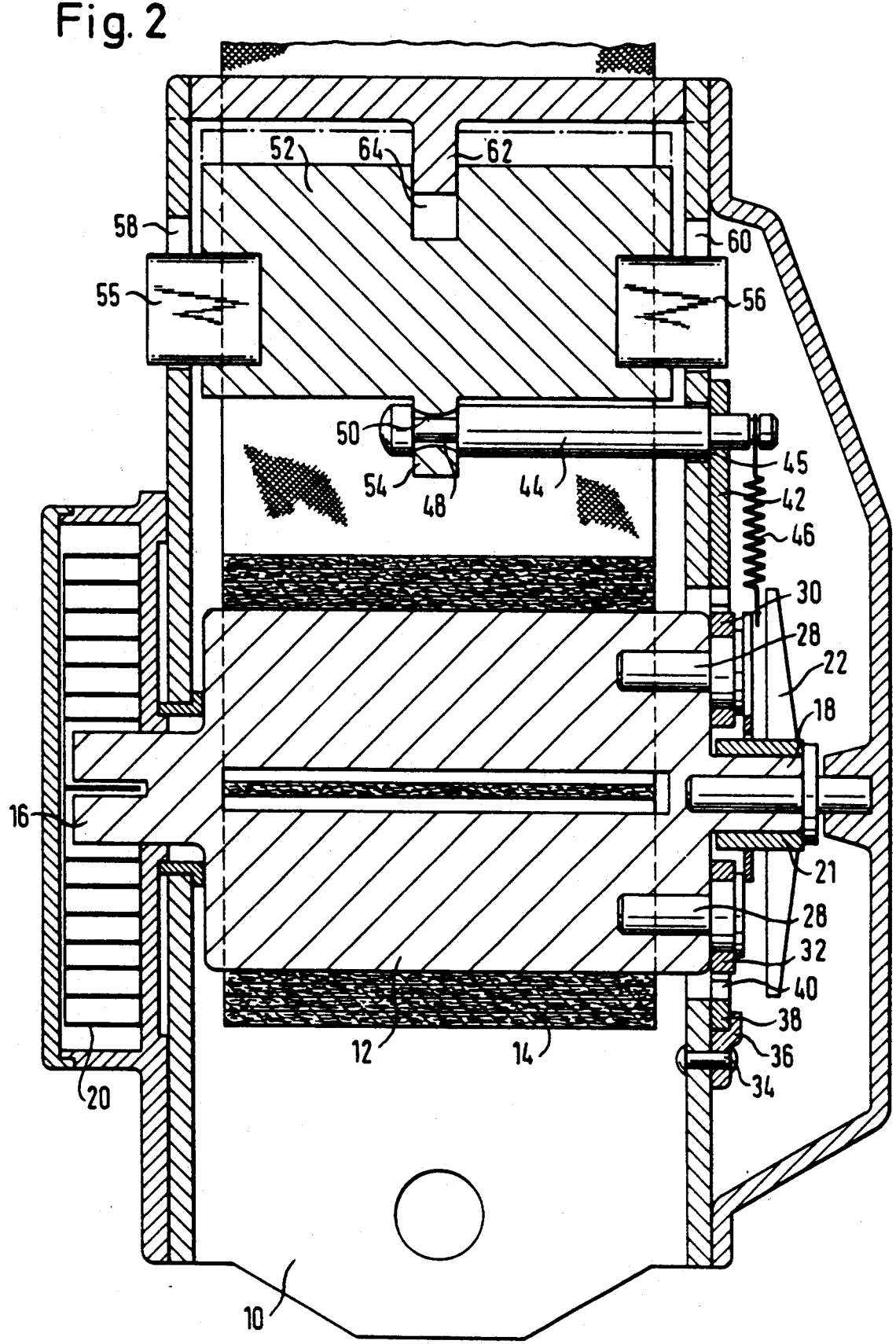
FIG. 2 is a section of the safety belt retractor shown in FIG. 1 through the axis of the retractor shaft.
Figure 3:
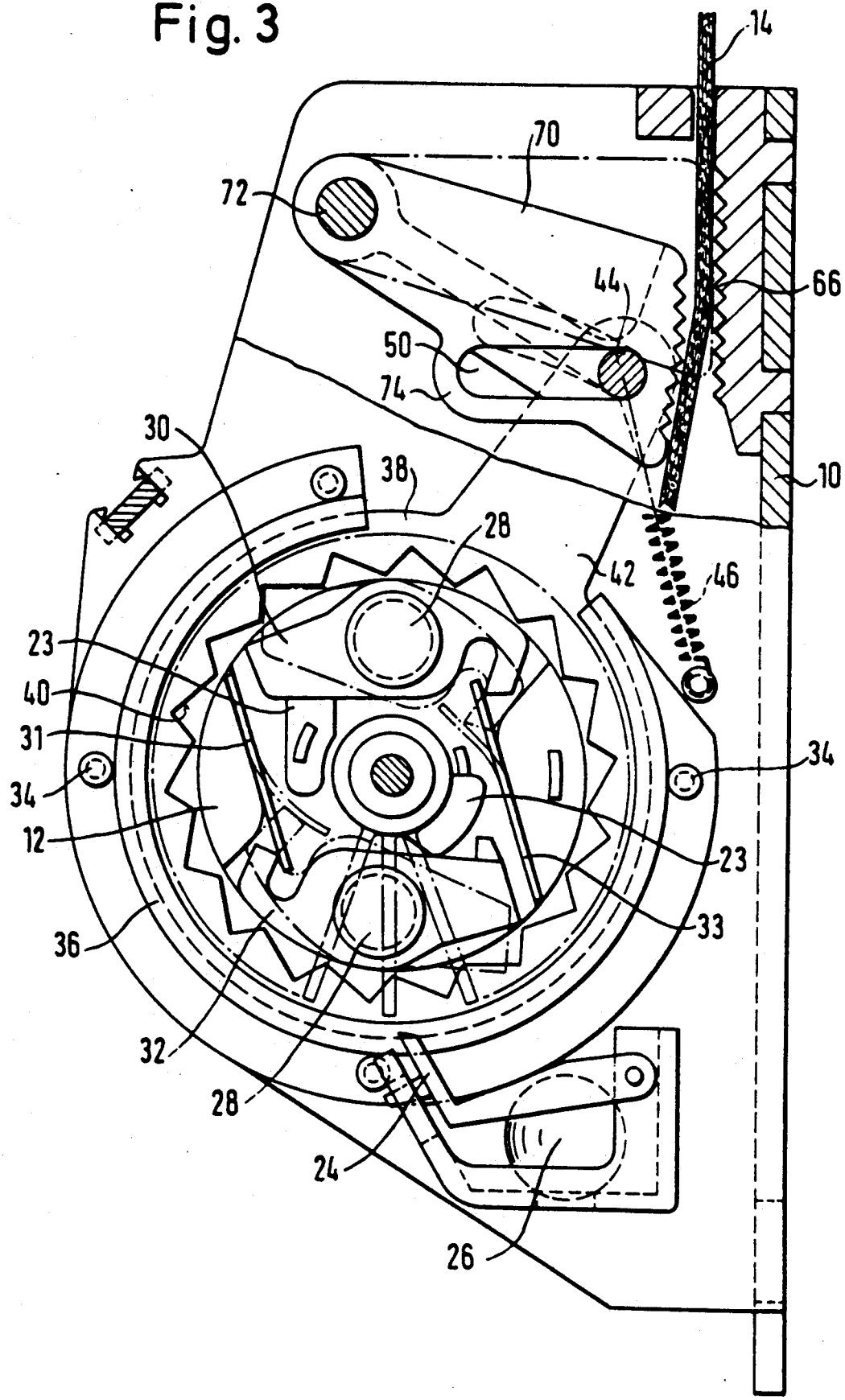
FIG. 3 is a partially sectioned side elevation of a second embodiment of the safety belt retractor.
Figure 4:
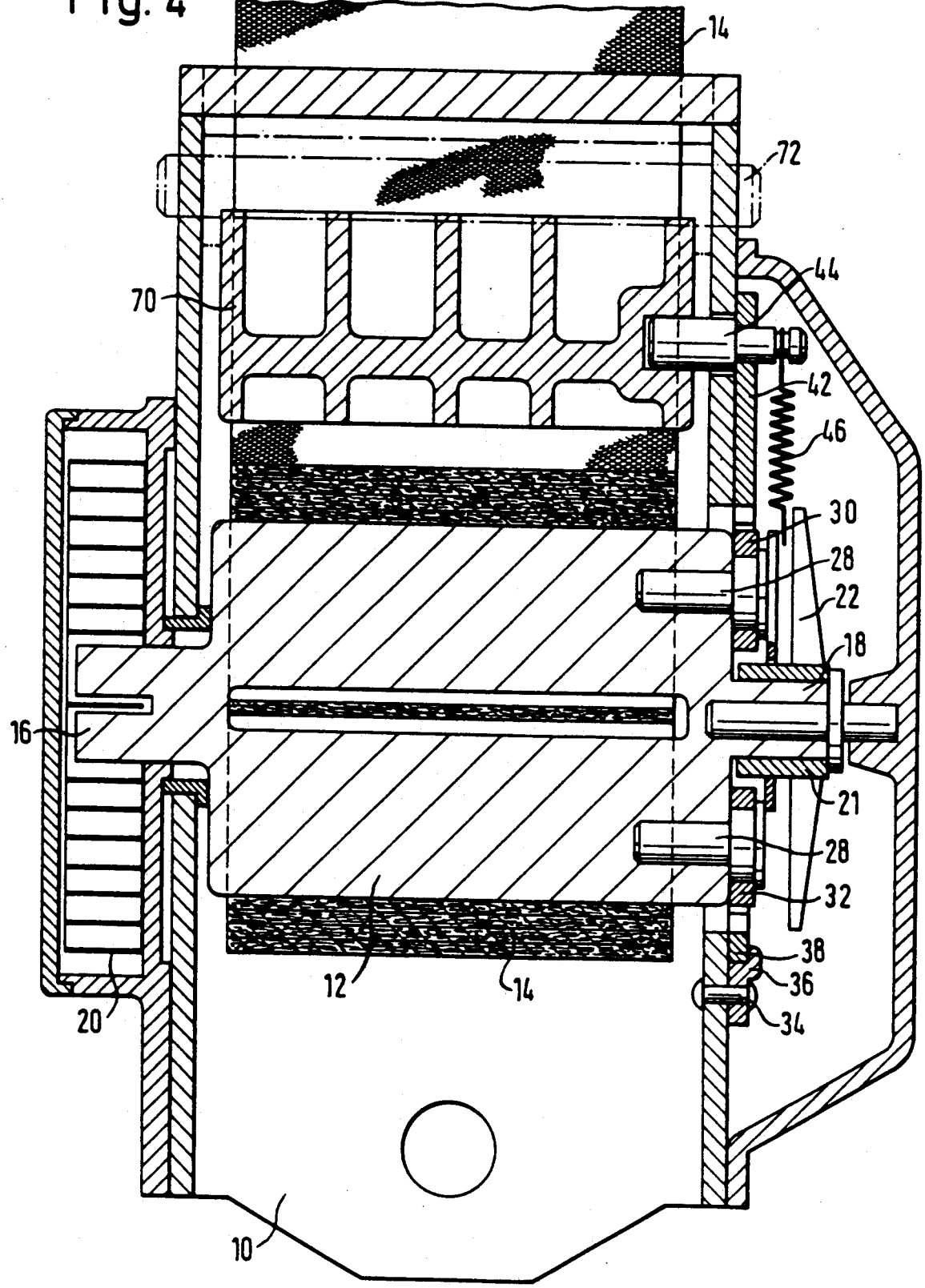
FIG. 4 is a section of the safety belt retractor shown in FIG. 3 through the axis of the retractor shaft.
Figure 5:
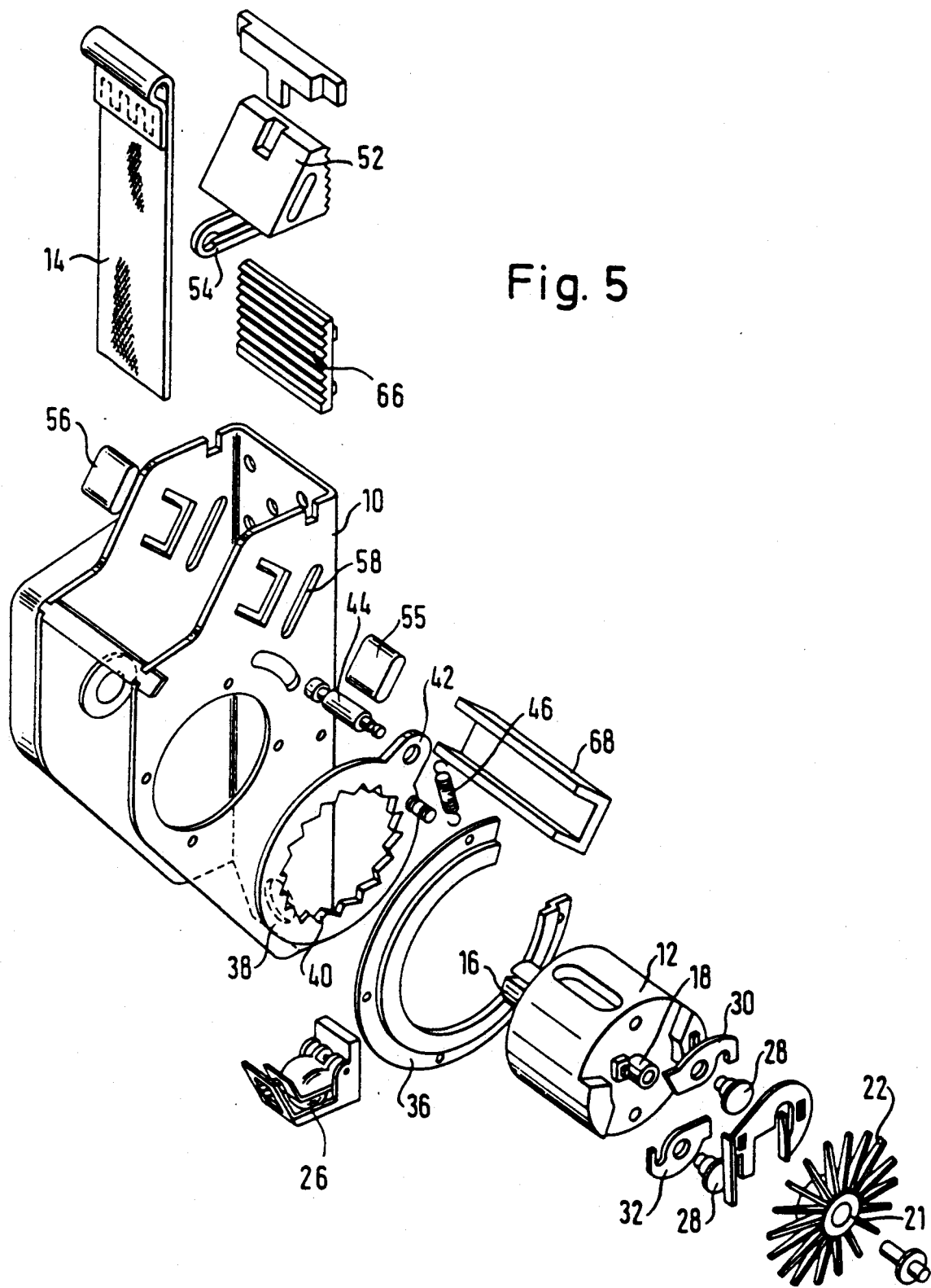
FIGS. 5 and 6 are perspective views of the two embodiments.
Figure 6:
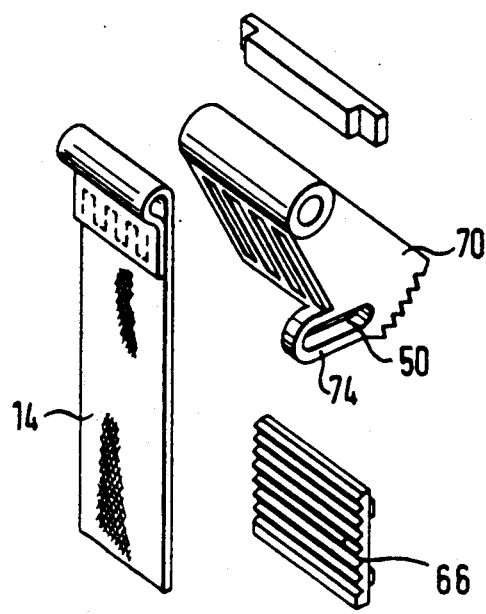
Figure 6:
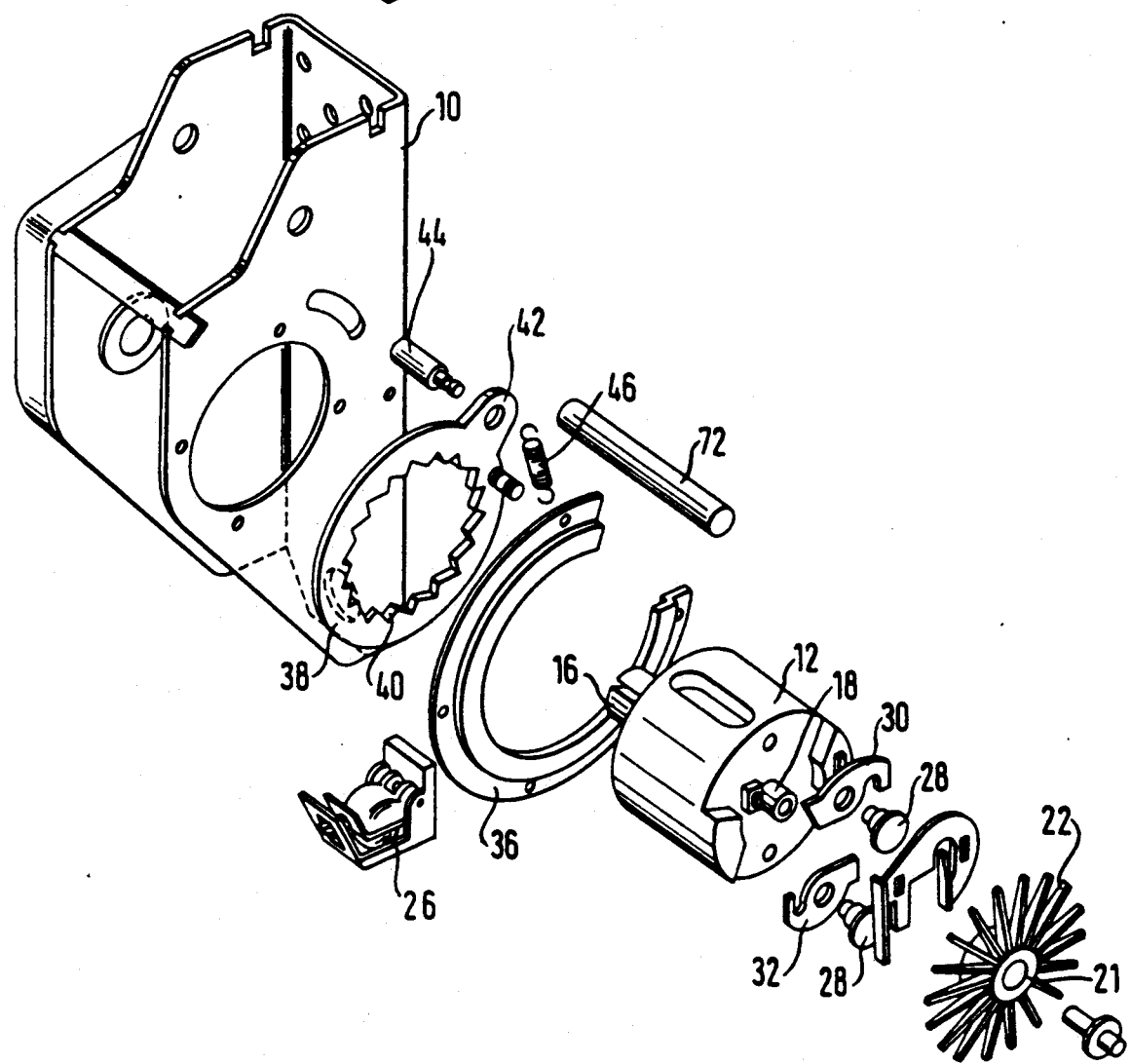

The embodiment shown in FIGS. 3 and 4 differs from that according to FIGS. 1 and 2 in the form of the clamping member. The embodiment according to FIGS. 3 and 4 will not be described again in so far as it is identical to that according to FIGS. 1 and 2.

In the embodiment according to FIGS. 3 and 4 the clamping member is formed as clamping lever 70. At its one side said clamping lever 70 is pivotally mounted in a loadbearing manner on a shaft 72 between the side flaps of the housing 10. At its other end the clamping lever 70 is provided with a clamping face which lies opposite the clamping face 66 or the webbing 14. The slot 50 is formed in an eye-like lateral transmission extension 74 of the clamping lever 70. Since the clamping lever 70 is pivotally mounted on the shaft 72 no further guide means are required. As a comparison of FIGS. 1 and 3 shows the embodiment according to FIG. 3 is distinguished by a particularly small overall length. The self-intensifying effect required for reliable clamping of the webbing 14 is ensured by suitable choice of the geometrical conditions, in particular by the dimensioning of the angle of the clamping lever 70 to the clamping face 66.

In a further embodiment, which is not separately illustrated in the drawings and can be combined with both embodiments described, on each side of the retractor shaft 12 there is an actuating mechanism having coupling pawls, internally toothed wheel and actuating nose for the clamping member, so that the latter is driven simultaneously on both its sides. To obtain complete synchronism of the driving on both sides it is expedient to connect the two actuating noses or rings non-rotatably to each other.

In the embodiments described the return of the clamping member is effected via the return spring 46 engaging the pin 44 because the coupling means formed by the pin 44 and slot 50 transmits both pressure and tension. In a further embodiment not separately illustrated in the drawings the end of the extension arm 42 forms a cam which runs on a curved face of the clamping member and transmits only pressure to the latter. In this case a separate return spring is associated with the clamping member.

Figure 7:
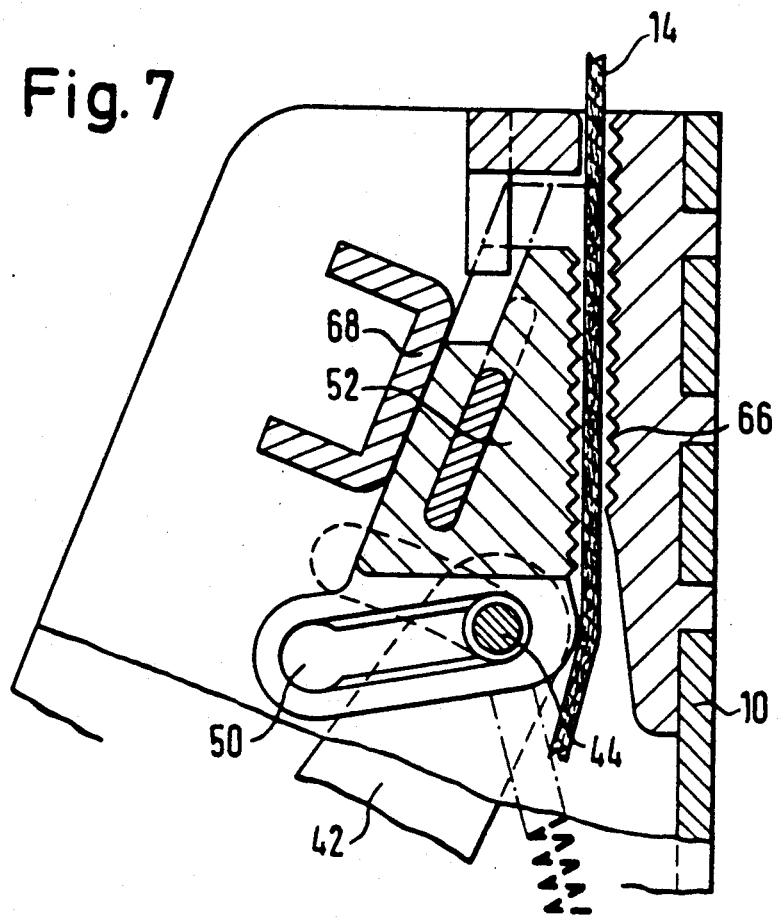
FIGS. 7 and 8 show two constructional variants of the two embodiments.
Figure 8:
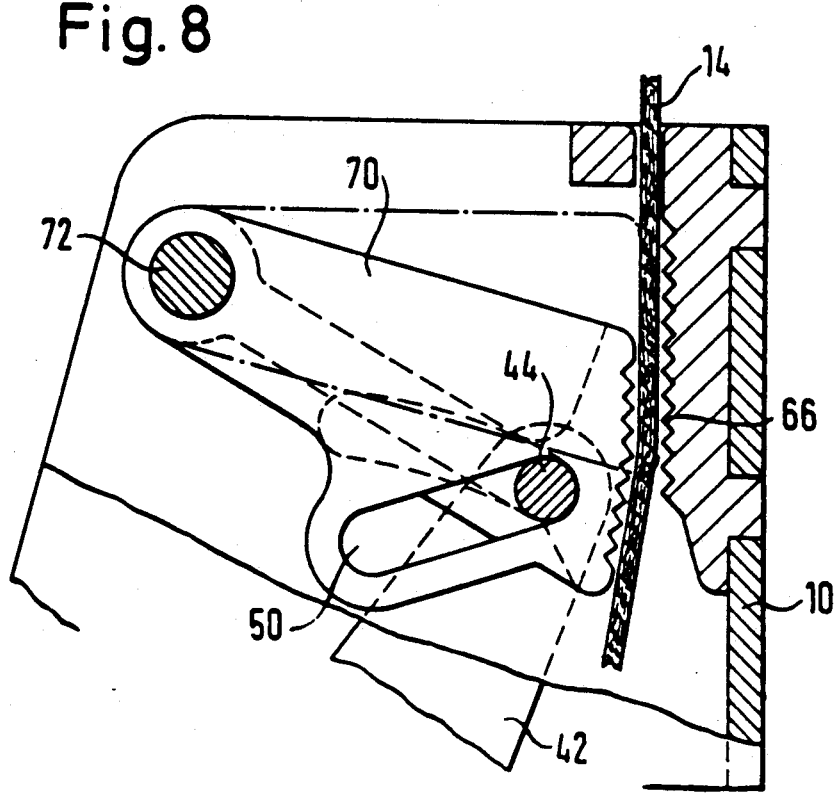

In the variants shown in FIGS. 7 and 8 of the embodiments according to FIGS. 1 to 6 the slot 50 is aligned at an angle different from 90° to the plane of the clamping face 66. By dimensioning this angle and shaping the form of the slot 50 different to the straight form illustrated the clamping behaviour can be varied within wide limits. In particular, it is then possible to achieve that after an effected clamping the clamping member is returned with little force application from the clamping position to the release position so that the return spring 46 can be made of correspondingly weak dimensions, thereby again making it possible to achieve low driving forces. On the other hand, depending on the use it may be desirable for the clamping member to remain in the clamping position once clamping has been effected. This can also be achieved by shaping and alignment of the slot 50.

I claim:
1. Safety belt retractor comprising:
a loadbearing housing;
a retractor shaft mounted rotatably in the housing:
a webbing clamping means following the retractor shaft in the webbing withdrawal direction and having a clamping member mounted movably on the housing and a housing-fixed clamping face opposite and spaced from said member and
an actuating means which is activatable at least in webbing sensitive manner and which on activation presses the clamping member against the webbing and the latter against the clamping face; said actuating means comprising an internally toothed ring rotatably mounted on the housing, an actuating nose connected to said ring and one pawl which is mounted laterally on the retractor shaft eccentrically and pivotally and has an engagement face which lies opposite the internal toothing of the ring and which by mass inertial forces can be driven against the force of a return spring into coupling engagement with the internal toothing of the ring, said actuating nose of said actuating means directly engages said webbing clamping means, and on the side of the retractor shaft a second pawl is mounted eccentrically and pivotally, the engagement faces of the pawls on the side of the retractor shaft being offset with respect to each other in the peripheral direction by an angle which corresponds, at least, approximately to an odd multiple of half the pitch step of the internal toothing of the ring.

2. The safety belt retractor according to claim 1, wherein each pawl is mounted at least approximately at its center of gravity.

3. The safety belt retractor according to claim 1, wherein the pawls lie approximately diametrically opposite each other.

4. The safety belt retractor according to claim 1, wherein the clamping member is a clamping shoe which on its side remote from the clamping face comprises a ramp face which is inclined towards the webbing path and bears on a housing-fixed counter face.

5. The safety belt retractor according to claim 1, wherein the actuating means is formed by an arm which extends from the periphery of the ring and the free end of which on rotation of the ring describes an arc, coupling means being provided between said arm and the clamping member to convert the pivot movement of the extension arm occurring on rotation of the ring to a stroke of the clamping member, said stroke having a magnitude which corresponds at least approximately to the projection of the arc described by the free end of the arm on pivotal movement thereof onto a plane parallel to the clamping face.

6. The safety belt retractor according to claim 5, wherein the coupling means is formed by a pin secured to the free end of the arm and a slot which is formed in or on the clamping member and into which the pin engages.

7. The safety belt retractor according to claim 6, wherein the pin comprises a cylindrical groove which is placed between two flange faces which bear on the side faces of a flat transmission member which is connected to the clamping member and in which the slot is formed.

8. The safety belt retractor according to claim 1, wherein the clamping member and the housing comprise cooperating translational guide means and ribs or webs slidingly displaceable therein.

9. The safety belt retractor according to claim 1, wherein the ring is mounted between a side wall of the housing and an annular or partially annular guide disc which is secured to the same side wall of the housing and which with the side wall forms a receiving space in which the ring is mounted rotatably with slight play.

10. The safety belt retractor according to claim 1, wherein the clamping member is formed at the end of a lever pivotally mounted in the housing.

11. The safety belt retractor according to claim 6, wherein the longitudinal direction of the slot formed in or on the clamping member is aligned substantially perpendicularly to the clamping face.

12. The safety belt retractor according to claim 1, wherein the ring with the actuating means is rotatable within limits which are defined only by the travel of the clamping member via the coupling thereof to the actuating means.

13. The safety belt retractor according to claim 1, wherein a vehicle sensitive pilot means is provided which consists of an inertial sensor with control pawl and a control gear of which the teeth lie opposite the control pawl and which is mounted at the same side of the retractor shaft as the pawls rotatably in limited manner with respect to the latter and carries an actuating nose which acts directly on the pawls.

* * * * *